United States Patent [19]

Carter et al.

[11] Patent Number: 5,370,896
[45] Date of Patent: Dec. 6, 1994

[54] EMULSIONS

[75] Inventors: Jeremy B. Carter, Bedford; Suzanne M. O'Brien, Rushden, both of United Kingdom

[73] Assignee: Van den Bergh Foods Co., Division of Conopco, Inc., Lisle, Ill.

[21] Appl. No.: 109,299

[22] Filed: Aug. 19, 1993

[30] Foreign Application Priority Data

Aug. 28, 1992 [EP] European Pat. Off. ......... 92307885.1

[51] Int. Cl.$^5$ .............................................. A23L 1/39
[52] U.S. Cl. ................................... 426/589; 426/602; 426/613
[58] Field of Search ................ 426/589, 602, 603, 613

[56] References Cited

U.S. PATENT DOCUMENTS 5,084,295 1/1992 Whelan et al. ..................... 426/602
5,217,742 6/1993 Jones et al. ......................... 426/602

FOREIGN PATENT DOCUMENTS 0076548 4/1983 European Pat. Off. .
0297690 1/1989 European Pat. Off. .
2035360 6/1980 United Kingdom .

Primary Examiner—Jeanette Hunter
Attorney, Agent, or Firm—Gerard J. McGowan, Jr.

[57] ABSTRACT

A rich and creamy sauce or soup is provided with a reduced fat content by incorporating the fat droplets in two populations, i.e. droplets above 10 microns and droplets below 5 microns, with the emulsion being substantially free of fat droplets between 5 and 10 microns.

7 Claims, No Drawings

EMULSIONS

FIELD OF THE INVENTION

This invention relates to sauces for intended addition in a heated state to prepared food or for addition to food for preparation together; and to soups.

BACKGROUND TO THE INVENTION

There is generally a desire to reduce the concentration of fats and oils in food intake. However, in spite of this "healthy-eating" drive, there is also the requirement for food products to have the desired rich and creamy taste and appearance. This conflict of requirements is particularly noticeable in the sauce and soup market.

Both fats and oils are based on triglycerides and each may be used as a sauce or soup component, in order to achieve the necessary textural characteristics, in particular creaminess and smoothness, in association with a desirable flavour. For convenience the term "fat" will be used to identify the liquid triglyceride component in the sauces or soups.

The applicants have now discovered that the desirable characteristics of low fat, creaminess, smoothness and richness can all be achieved in a sauce or soup, provided that the particle size distribution of the fat droplets dispersed in the aqueous medium is controlled.

SUMMARY OF THE INVENTION

Accordingly the present invention relates to a sauce or soup comprising from 2% to 10% by weight of fat droplets as an emulsion in an aqueous base wherein the droplets exist in two populations:
(a) large droplets of at least 10 $\mu$m in size; and
(b) small droplets of less than 5 $\mu$m in size; such that the emulsion is substantially free of fat droplets between 5 and 10 $\mu$m;
providing that the sauce or soup comprises at least 1% large droplets.

A two population, i.e. bimodal, emulsion is described in EP 0076548 (Unilever) in a spread composition. However this is used in the preparation of a duplex O/W/O emulsion.

A sauce as prepared by a chef will usually have a small amount of butter stirred in as a last step in the preparation. It is expected this will form coarse droplets above 10 micron. The fat content of the base sauce before final butter addition would have a droplet size extending over a range and not limited to below 5 micron.

DISCLOSURE OF THE INVENTION

The invention relates to the provision of a rich and creamy sauce or soup having a bimodal fat droplet distribution, the sauce or soup being substantially free of fat droplets in the 5 to 10 $\mu$m size range because in this range there are only the tails of droplet distribution.

The bimodal fat droplet distribution provides the sauce or soup with both a "rich" gloss and with a creamy smoothness which consumers desire and in the case of sauces associate with a higher fat sauce. At fat levels above 10% enhancing properties achieved by the use of a bimodal distribution become less noticeable, while below 2% there is too little fat available to justify splitting into two populations. In order to achieve the desired level of richness within the sauce or soup, at least 1% large droplets must be present within the sauce or soup. Preferably the composition comprises 1–3% large droplets, most preferably 2% large droplets.

Furthermore, preferably the total fat content is at least 3%, more preferably 3 to 7%, most preferably 5% by weight of the composition.

Preferably the ratio of small to large droplets is from 4:1 to 1:4 (% fat by weight), more preferably 3:2 to 1:1, most preferably 3:2.

The small droplets must be less than 5 $\mu$m in size in order to achieve the benefits of the present invention. Preferably they are less than 2 $\mu$m in size. It is most preferred that the small droplets have a size distribution close to 1 $\mu$m.

The large droplets must be at least 10 $\mu$m in size. However, the large droplets may be much larger than this, for example droplets of 100 $\mu$m may be present.

Although the sauce composition is defined as containing a specific range of fat, it must be appreciated the resultant sauce will have the desired textural characteristics of a standard sauce containing fat droplets having a wide particle size distribution, but at a lower fat content.

Examples of the fats usable in the sauces of the invention are animal derived fats such as butter, tallow, lard and saturated and unsaturated fats, eg sunflower oil, maize oil, soya oil. These fats may optionally be hydrogenated.

A preferred feature of the invention is the use of polyunsaturated fats to replace some or all of the small droplets. Furthermore, the invention extends to the use of suitable fat replacers for either the large or small droplets.

Examples of suitable fat replacers to replace at least some of the large or small droplets include polyols which are aliphatic or aromatic compounds which comprise at least four free hydroxyl groups. Such polyols in particular include the group of sugar polyols, which comprises the sugars, i.e. the mono-, di- and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylylose, maltose, lactose, celloboise, raffinose, sucrose, erythritol, mannitol, lactitol sorbitol, xylitol and alphamethylglucoside. A generally used and preferred sugar polyol is sucrose.

The term 'polyol fatty acid polyester' is intended to refer to any such polyesters or mixtures thereof of which, on an average, more than 70% of the polyol hydroxyl groups have been esterified with fatty acids.

Examples of suitable fat replacers to replace some or all of the small droplets include fat replacers based on Starch, Maltodextrin, Cellulose , Pectin, Gums and Proteins (whey, milk etc) with trade names such as Stellar (Staley), N-Lite (National Starch), Avicel (FMC Corporation), Slendid (Hercules), Emulgum (Colloid Natureis), Simplesse (Nutrasweet Co.) and combinations of these materials, optionally with added milk solids, Titanium Dioxide or other whitener to improve opacity.

The two components of the emulsion may each contain other components, for example, colours, flavours, emulsifiers, stabilisers and thickeners. There is not criticality in these other components, although the proportions and processing may require variation to obtain the desired product.

The soup or sauce product may be sold in dry-mix or liquid form. Examples of suitable liquid product forms include ambient, chilled, frozen and sterilised products.

EXAMPLES

Examples of sauces will now be given to illustrate, but not limit, the invention.

Test Methods i) Fat droplet distribution: this was measured using a Malvern Mastersizer type MS20 obtainable from Malvern Instruments and a standard microscope.

ii) Viscosity: this was measured using a Contraves Rheomat 115 obtainable from Mettier-Toledo at 60° C. and 50 sec$^{-1}$ shear rate.

Example I

An initial fine emulsion was prepared using the components:

|  | % wt |
| --- | --- |
| Butter (unsalted) | 37.5 |
| Skim Milk Powder (SMP) | 7.0 |
| Water | 53.5 |
| Sodium caseinate | 2.0 |

To produce 5 kg of fine emulsion, 2.675 kg of water was heated to approximately 60° C. in a steam kettle; 350 g skim milk powder and 100 g sodium caseinate were mixed together and added to the heated water which was being stirred with a Silverson mixer type SXFP. 1.875 kg of molten butter was then added and the mix stirred while maintaining the temperature at 60° C.

This mixture was then homogenised at 2 litres/minute through a Crepaco piston homogeniser (obtainable from Crepaco/APV) at 60° C. and at a pressure of 150 Bar. This emulsion contained fat droplets of mean diameter 0.7 microns with 90% less than 1.24 microns and 99.9% less than 4 microns. 1 kg of this emulsion was added, with stirring, to 8.75 kg of an aqueous phase at 70° C. comprising the remaining components of a wine based sauce.

This aqueous base was prepared by boiling in a steam kettle 2.1 kg of a mixture of white wine and vermouth to reduce to approximately half the original weight, then adding 5.8 kg chicken bone stock and appropriate herbs and spices and warming to just below boiling point. To this was added 400 g of a modified waxy maize starch that had been slurried in 750 g water; the mix was returned the boil and then adjusted with extra water to yield a final weight of 8.75 kg.

250 g of butter was then mixed into the whole with a paddle stirrer so as to provide 2.0% by weight in the total sauce of fat droplets above 10 microns.

The sauce obtained could be frozen before reheating and serving. The droplet size distribution was not changed by freezing.

Examination by microscope before freezing showed the sauce had an uneven fat droplet size distribution, with the majority of fat droplets being of the order of 1 micron and less than 5 microns in diameter, but with a smaller number of larger droplets in the 10 to 100 microns range. The sauce product had 3% fat as fine emulsion and 2% as coarse emulsion, i.e. above 10 micron. It was a rich creamy sauce with a smooth surface.

Example II

Example I was repeated but the butter intended to provide the coarse emulsion was paddle stirred into the aqueous base at 60° C. This emulsion was then mixed by paddle stirring into the fine emulsion. Thus each of the two emulsions forming the bimodal droplet size distribution were prepared separately.

This sauce had the droplet size distribution of Example I and the same consumer characteristics.

Example III

A fine emulsion using sunflower oil (SFO) was prepared to the composition:

|  | % wt |
| --- | --- |
| SFO | 30.0 |
| Water | 61.0 |
| (SMP) | 7.0 |
| Sodium caseinate | 2.0 |

3.05 kg of water was heated to at least 60° C. and 350 g skim milk powder and 100 g sodium caseinate added. The mixture was mixed by the Silverson of Example I until smooth. 1.5 kg sunflower oil was heated to approximately 60° C. and then mixed into the water containing the milk proteins using the Silverson for 30 seconds. Homogenisation was effected by passing the mix through the Crepaco homogeniser at 3 litres/minute at 50 Bar pressure at 60° C. 1 kg of this fine emulsion, i.e. 10% of final sauce, was then mixed with 8.75 kg of the aqueous base from Example 1 and then 250 gm butter paddle stirred in at 60° C.

This sauce had the fine emulsion formed using polyunsaturated oil (3% in total) and butter (2% in total) forming the coarse, i.e. above 10 micron, emulsion.

This sauce had a rich creaminess, a butter taste and a smooth appearance which was appreciated by consumers.

Thus the invention allows a bimodal emulsion sauce to be prepared with reduced fat content and also, optionally, with a health preferred fat as a part of the fat content.

Example IV Comparative Examples A–D 4 different sauces were prepared by taking part mixes at 3 stages during the preparation of the fine emulsion described in Example I, specifically after:

- dispersing the Sodium Caseinate and Skimmed Milk Powder in the water
- adding the butter and stirring with a Silverson mixer type SXFP to produce a standard intermediate emulsion
- homogenising the Silversoned Emulsion with the Crepaco Piston Homogeniser to produce the Fine Emulsion according to composition table below

|  | Caseinate/ SMP solution | Silversoned Emulsion | Homogenised Emulsion |
| --- | --- | --- | --- |
| Skim Milk Powder | 350 | 350 | 350 |
| Na Caseinate | 100 | 100 | 100 |
| Water | 2675 | 2675 | 2675 |
| Butter |  | 1875 | 1875 |
|  | 3125 | 5000 | 5000 |

These were then mixed with the hot aqueous phase described in Example I to produce 4 sauces with the following compositions.

|  | A | B | C | VI |
|---|---|---|---|---|
| Butter | — | 5.88 | — | 2.36 |
| Homogenised Emulsion | — | — | 15.70 | 9.45 |
| Silversoned Emulsion | 15.70 | — | — | — |
| Caseinate/ SMP solution | — | 9.82 | — | 3.89 |
| Aqueous phase | 84.30 | 84.30 | 84.30 | 84.30 |
|  | 100.00 | 100.00 | 100.00 | 100.00 |

| Example | Composition |
|---|---|
| A | Sauce containing standard fat droplet distribution |
| B | Sauce containing droplets >10 $\mu$m |
| C | Sauce containing droplets <5 $\mu$m |
| IV | Sauce having split emulsion |

The sauces were evaluated using a trained panel of tasters for creaminess (opaque, milk coloured and smooth in appearance); and richness (shine on surface, buttery taste).

| Example | Results Sensory Evaluation |
|---|---|
| A | Not rich, and not adequately creamy |
| B | Rich but not creamy |
| C | Creamy but not rich |
| IV | Rich and creamy |

We claim:

1. A sauce or soup comprising from 2% to 10% by weight of fat droplets as an emulsion in an aqueous base wherein the droplets exist in two populations:
   (a) large droplets of at least 10 $\mu$m in size; and
   (b) small droplets of less than 5 $\mu$m in size;
   such that the emulsion is substantially free of fat droplets between 5 and 10 microns;
   providing that the sauce or soup comprises at least 1% large droplets.

2. A sauce or soup according to claim 1 wherein the ratio of small to large droplets is 4:1 to 1:4.

3. A sauce or soup according to claim 1 wherein the ratio of small to large droplets is 3:2 to 1:1.

4. A sauce or soup according to claim 1 wherein the ratio of small to large droplets is 3:2.

5. A sauce or soup according to claim 1, wherein the small droplets are less than 2 $\mu$m in size.

6. A sauce or soup according to claim 1 wherein the small droplets include a polyunsaturated fat.

7. A sauce or soup according to claim 1 wherein the small droplets include a fat replacement system.

* * * * *